United States Patent
Chi

(10) Patent No.: US 7,213,896 B2
(45) Date of Patent: May 8, 2007

(54) FLEXIBLE BEARING SPACER

(75) Inventor: Quinn Chi, El Monte, CA (US)

(73) Assignee: Accuride International Inc., Santa Fe Springs, CA (US)

( * ) Notice: Subject to any disclaimer, the term of this patent is extended or adjusted under 35 U.S.C. 154(b) by 0 days.

(21) Appl. No.: 11/137,743

(22) Filed: May 24, 2005

(65) Prior Publication Data

US 2005/0218761 A1    Oct. 6, 2005

Related U.S. Application Data

(63) Continuation of application No. 10/336,057, filed on Jan. 3, 2003.

(51) Int. Cl.
 *A47B 88/04* (2006.01)

(52) U.S. Cl. ..................... 312/334.8; 384/18; 384/51

(58) Field of Classification Search ............. 312/330.1, 312/334.1, 334.7, 334.11, 334.17, 334.25, 312/334.26, 334.33, 334.38; 384/18, 19, 384/20, 22, 23, 51
See application file for complete search history.

(56) References Cited

U.S. PATENT DOCUMENTS

| | | | |
|---|---|---|---|
| 3,181,925 A * | 5/1965 | Fischer ........................ | 384/18 |
| 3,186,772 A * | 6/1965 | Max ............................ | 384/18 |
| 3,937,531 A | 2/1976 | Hagen et al. | |
| 3,966,273 A | 6/1976 | Hagen et al. | |
| 3,975,063 A | 8/1976 | Mahotka et al. | |
| 4,004,840 A * | 1/1977 | Johnston et al. ............. | 384/526 |
| 4,252,382 A | 2/1981 | Thomas | |
| 4,511,187 A | 4/1985 | Rees | |
| 4,662,761 A | 5/1987 | Hoffman | |
| 4,679,950 A | 7/1987 | Delmege et al. | |
| 4,991,981 A | 2/1991 | Baxter | |
| 5,181,781 A | 1/1993 | Wojcik | |
| 5,417,496 A * | 5/1995 | Hobbs ......................... | 384/18 |
| 5,542,759 A | 8/1996 | Krivec | |
| 5,851,059 A | 12/1998 | Cirocco | |
| 6,015,199 A | 1/2000 | Netzer et al. | |

FOREIGN PATENT DOCUMENTS

| | | |
|---|---|---|
| DE | 29704015 | 5/1997 |
| TW | 499905 | 8/2002 |

OTHER PUBLICATIONS

International Search Report for International patent Application No. PCT/US2004/000082, filed Jan. 2, 2004, International Search Report mailed Apr. 7, 2005 (3 pgs.).
Written Opinion of the International Searching Authority for International Patent Application No. PCT/US2004/000082, filed Jan. 2, 2004, International Search Report mailed Apr. 7, 2005 (5 pgs.).

\* cited by examiner

*Primary Examiner*—James O. Hansen
(74) *Attorney, Agent, or Firm*—Christie, Parker & Hale LLP

(57) ABSTRACT

A bearing spacer for use in a drawer slide assembly, having a first end portion, a second end portion opposite the first end portion, one or more bearing retaining portions, located between the first and second end portions, and one or more compressible portions, located between the first and second end portions.

11 Claims, 18 Drawing Sheets

FLEXIBLE BEARING SPACER

CROSS-REFERENCE TO RELATED APPLICATION

The present application is a continuation of U.S. patent application Ser. No. 10/336,057 filed Jan. 3, 2003, entitled Flexible Bearing Spacer, the disclosure of which is incorporated by reference.

BACKGROUND OF THE INVENTION

The present invention relates generally to slide assemblies, and more particularly to bearing spacers for slide assemblies.

Slide assemblies, sometimes referred to as drawer slides, are often used to provide extensible mounting of drawers, equipment, or other items, to racks or cabinets. In such applications, an item, such as a drawer, is mounted to another item, such as a cabinet, by way of extendable slides. The slides generally include at least two slide members slidably, or rollably, extendable with respect to one another. Generally, one slide member is attached to a cabinet, for example, and another slide member is attached to a drawer, for example. At times one drawer slide assembly is used, often two drawer slide assemblies are used. The drawer may then be pulled outward from the cabinet, with the drawer supported by the extending slides.

In such applications, it is often beneficial to have the slide members reliably and repeatedly transfer a load carried by the drawer to the cabinet. The load transfer should be stable and repeatable when the drawers are in a closed position within the cabinet, in an open position extending from the cabinet, and at points in between. Moreover, the load transfer function performed by the drawer slides should be maintained over repeated extensions of the slides over long periods of time.

One way reliable and repeatable transfer of load from a drawer slide member affixed to drawer and a drawer slide member affixed to a cabinet is accomplished is by way of bearings coupling the slide members. The bearings are preferably largely maintained in relative position to one another, as well as appropriately positioned during operation of the slide assembly. The bearings are often positioned relative to one another using bearing spacers. The bearing spacers generally maintain bearings in relatively fixed positions with respect to one another. Moreover, often the bearing spacers are used in a recyclable fashion. By recyclable, what is meant is that opening and closing of the drawer slides, i.e. cycling the drawer slides, results in the bearing spacers being reset to a particular position. This generally occurs upon a full extension for closing of the drawer slide, with the bearing spacers striking the front or the rear of the slide, or a tab lanced out of the slide.

Unfortunately, the bearing spacers may be damaged by the forces imposed on the spacer by repeatedly striking the ends of the drawer slide, particularly over the somewhat lengthy service life of a drawer slide. When the bearing spacers strikes the end of the drawer slide an audible noise may be made. Noise associated with the opening and closing of drawer slides is, however, often undesirable.

SUMMARY OF THE INVENTION

In one aspect, the invention provides a drawer slide assembly having a first slide member and a second slide member, each having an elongate planar web bounded by a first bearing raceway and a second bearing raceway along opposing margins of the web, the bearing raceways running substantially the length of the planar web, a bearing spacer having a first end and a second end, a bearing retaining portion, at least one flexible portion located between the first end and the second end, and a plurality of bearings disposed in the bearing retaining portion of the bearing spacer, the bearings in rolling engagement with either the first raceways or the second raceways.

In another aspect, the invention provides a drawer slide assembly having a first slide member having an elongate planar web portion bounded by first and second arms extending therefrom and forming respective first slide member first and second bearing raceways, a second slide member having a planar web portion bounded by first and second arms extending therefrom and forming respective second slide member first and second bearing raceways, a bearing spacer having an intermediate portion bounded by end portions, the intermediate portion including a compressible section and a bearing retaining section, and a plurality of bearings in the bearing retaining section of the bearing spacer, where the bearings are in rolling engagement with either the first bearing raceways or the second bearing raceways.

In another aspect, the invention provides a bearing spacer for use in a substantially linear bearing raceway, having a means for retaining bearings, at least one compressible portion approximate the means for retaining bearings, and a plurality of bearings located within the means for retaining bearings, where the bearings are in rolling engagement with the bearing raceway.

In another aspect, the invention provides a bearing spacer for use in a drawer slide assembly, having a first end portion, a second end portion opposite the first end portion, one or more bearing retaining portions, located between the first and second end portions, and one or more compressible portions, located between first and second end portions.

In another aspect, the invention provides a drawer slide assembly having a first slide member having an elongate planar web, bounded by a first bearing raceway and a second bearing raceway along the length of the planar web, a second slide member having an elongate planar web, bounded by a first bearing raceway and a second bearing raceway along the length of the planar web, a bearing spacer having a first end portion, a second end portion opposite the first end portion, one or more bearing retaining portions located between the first and second end portions, one or more flexible portions located between the first and second end portions, and one or more bearings in rolling engagement with either of the raceways of the first and second slide members.

In another aspect, the invention provides a bearing spacer for use in a substantially linear bearing raceway having opposing end portions bounding the spacer, a means for retaining bearings, a spring means adjacent the means for retaining bearings, and a plurality of bearings located within the means for retaining bearings, and in rolling engagement with the bearing raceway.

In another aspect, the invention provides a bearing spacer for roller bearings, having a first end portion, a second end portion opposite the first end portion, at least one bearing retaining section defining an aperture, located between the first and second end portions, at least one compressible portion, and a plurality of roller bearings.

These and other aspects of the invention will be more fully comprehended upon review of this disclosure including accompanying figures.

DETAILED DESCRIPTION

Figure 1:
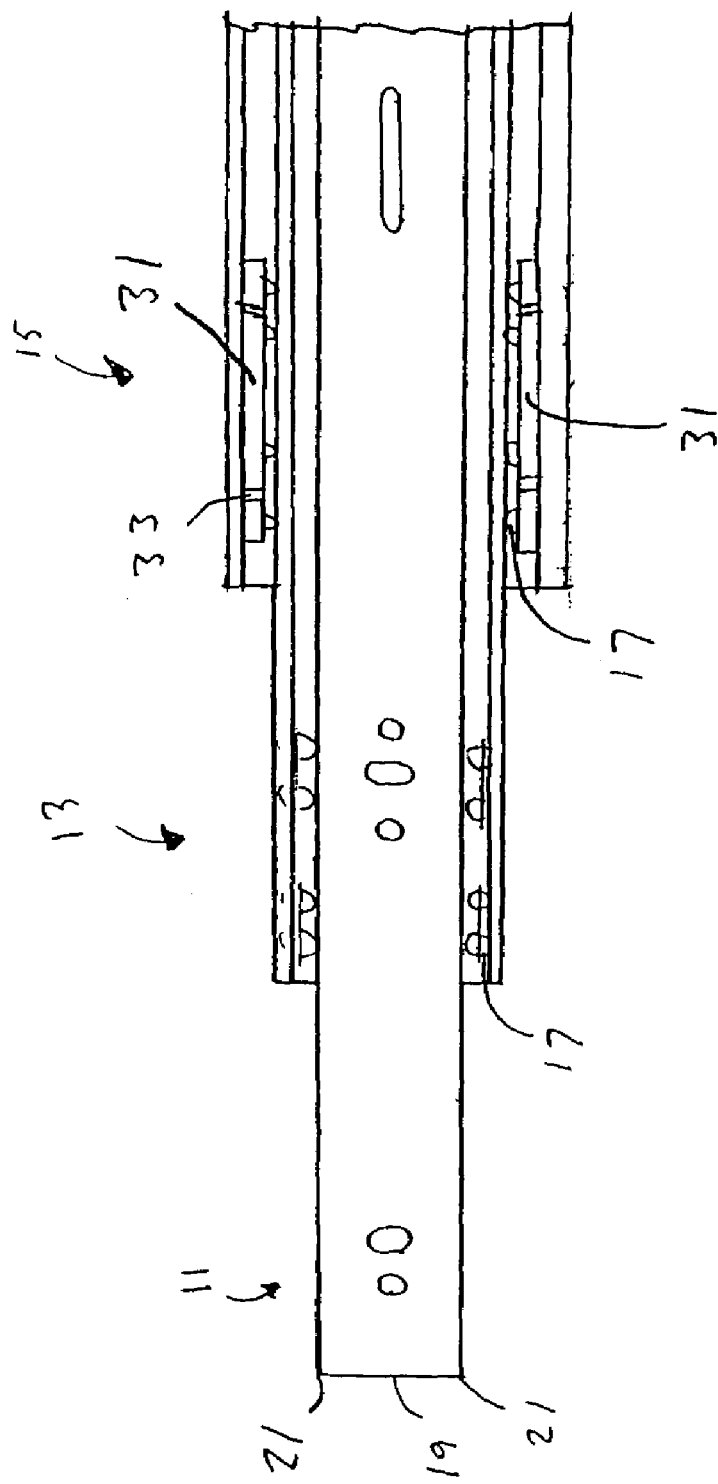
FIG. 1 illustrates a three-member telescopic slide in accordance with aspects of the invention.

FIG. 1 illustrates a drawer slide having bearing spacers in accordance with aspects of the invention. As illustrated, the drawer slide of FIG. 1 is a three-member telescopic slide. As with many telescopic slides, the slide of FIG. 1 includes an inner slide member 11 slidably coupled to an intermediate slide member 13, which in turn is slidably coupled to an outer slide member 15. The inner slide member and the intermediate slide member are coupled by bearings 17, as are the intermediate slide member and the outer slide member. Accordingly, the slide members may also be said to be rollably coupled to one another.

The inner slide member, intermediate slide member, and outer slide member have a generally C-shaped cross-section, and are largely nested within each other. Thus, the inner slide member has a slide member web 19 with arcuate bearing raceways 21 along the edges of the length of a planar web. The intermediate slide member also has a planar web 23 with arcuate bearing raceways 25 along the edges of the length of the planar web. Similarly, the outer slide member has a planar web 27 with arcuate bearing raceways 29 along the edges of the length of the planar web. Bearings couple the bearing raceways of the inner and intermediate slide members, and bearings also couple the raceways of the intermediate and outer slide members.

In use, the outer slide member is often coupled to a cabinet or a rack. The inner slide member is often coupled to a drawer or other item meant for extension from the rack.

Figure 2:
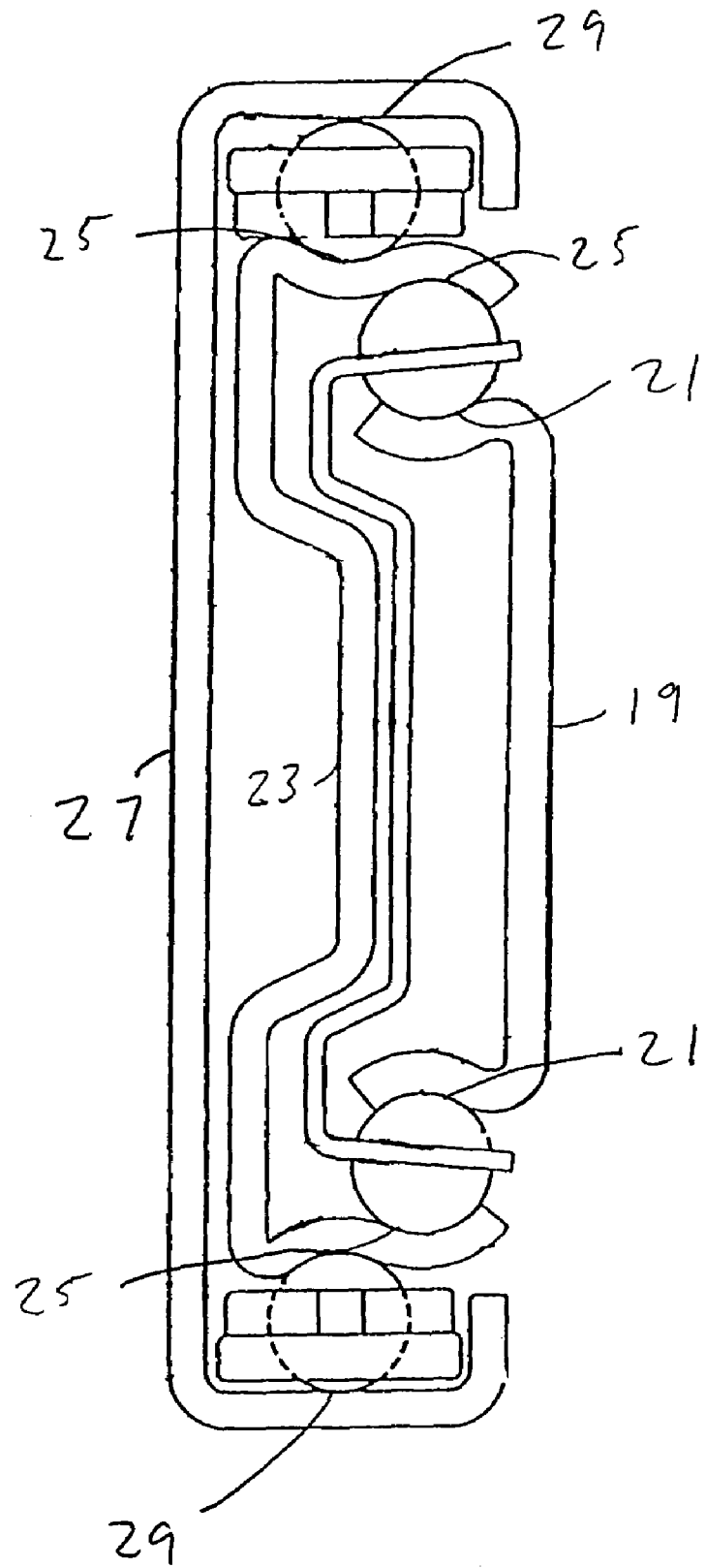
FIG. 2 illustrates a cross-section of the slide of FIG. 1.

FIG. 2 illustrates a cross-section of the slide of FIG. 1. As illustrated, the cross-section shows substantially c-shaped inner slide member, intermediate slide member, and outer slide member. Bearings couple raceways extending from planar webs of the slide members.

Returning to FIG. 1, the bearings coupling the intermediate and outer slide members, for example, are placed in bearing spacers 31. As illustrated, multiple bearing spacers are used, and groups of bearings are placed within bearing spacers. In general, the bearing spacers extend along the length of the drawer slide, and have recesses or apertures adapted to receive bearings. Thus, the bearing spacers maintain the bearings associated with the bearing spacer in relatively predefined positions with respect to one another. In the bearing spacer shown in FIG. 1, the bearing spacer additionally includes notches 33 within the length of the bearing spacer. The notches effectively form a spring within the bearing spacer. The notches allow for slight compression of the bearing spacer along its length.

Figure 3:
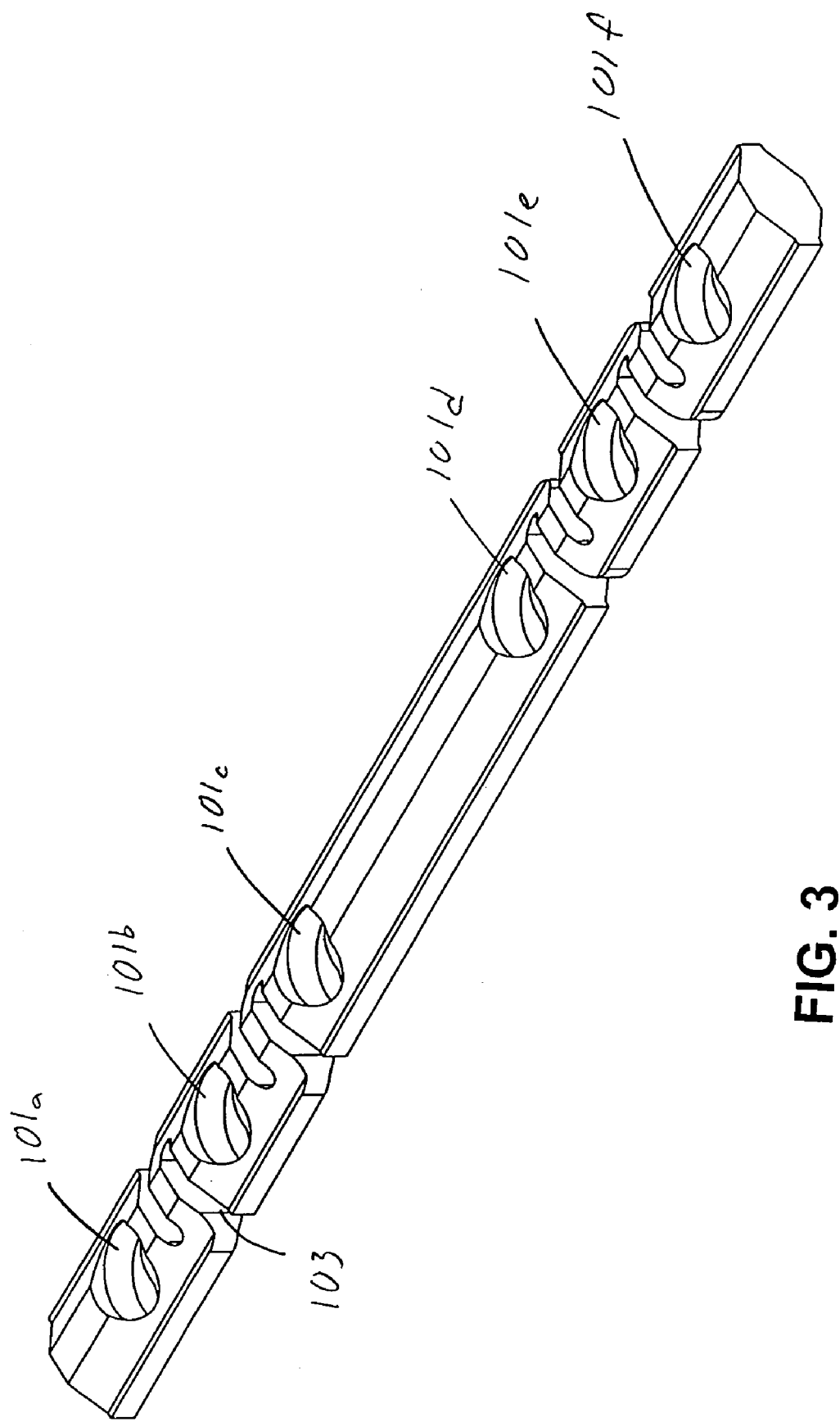
FIG. 3 illustrates a bearing spacer in accordance with the invention.

FIG. 3 illustrates an embodiment of a bearing spacer in accordance with the invention. The bearing spacer is a substantially elongate member. Apertures 101 within the elongate member are adapted to receive ball bearings. The elongate member also has notches 103 along its length. As illustrated in FIG. 3, the notches are provided in opposing pairs. Although the bearing spacer is made of substantially inflexible plastic along its length, the notches allow for slight compression of the bearing spacers when a force is applied to one end of the bearing spacer. Moreover, the locations of the notches within the length of the drawer slide allow for more uniform application of the force to the portions of the spacer about the notches, reducing the possibility of damage to the spacer. In addition, use of the notches within the length of the spacer provides a more uniform surface, and increased surface area, along the ends of the spacer, thereby decreasing the possibility of extensions from the spacer contacting or catching items, or otherwise causing difficulties. Further, having the notches, which form springs, between ball bearings allow for compression in a linear plane as the bearing restrict out of plane movement by the spacer.

As illustrated, the spacer is adapted to receive six ball bearings. Three apertures for receiving bearings are arranged linearly along the length of the spacer about each end of the spacer. Opposing notches are placed between each of the three apertures. The use of multiple pairs of notches, which largely form springs, is beneficial in that compression may be shared by multiple springs.

Figure 4:
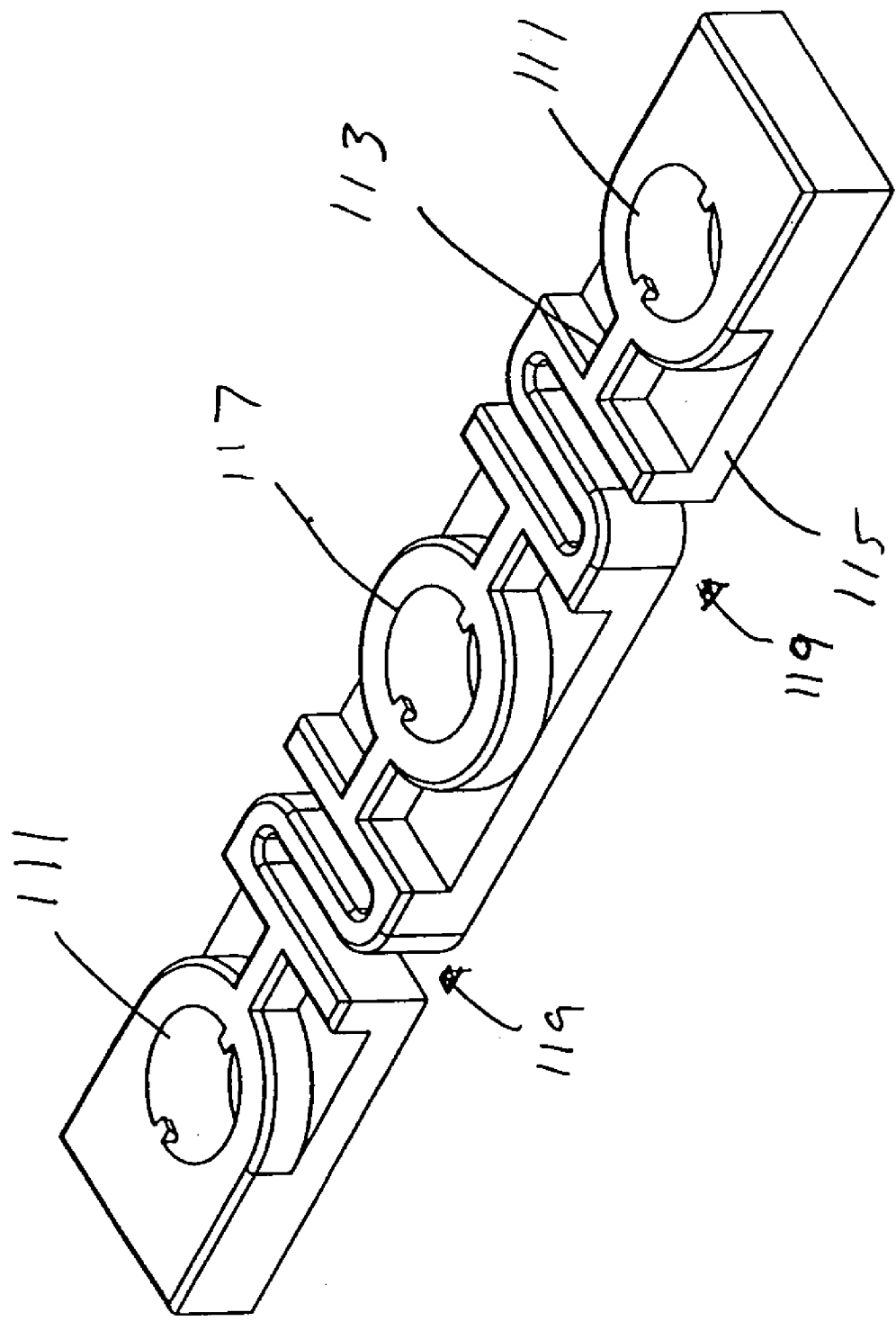
FIG. 4 illustrates another bearing spacer in accordance with the invention.

FIG. 4 illustrates a further bearing spacer in accordance with the invention. The spacer of FIG. 4 is adapted to receive three bearings. The spacer of FIG. 4 is formed of a plastic having a substantially rectangular cross-section. Bearings are placed in apertures 111 approximate either end of a substantially rectangular cross-sectional ends of the spacer. A spine 113 placed on a partial rectangular cross-section 115 connects the two outer receivers to a middle bearing receiver 117 approximately at the mid-point of the bearing spacer.

The spine forms along its length two opposing notches 119. The opposing notches may be viewed as forming the spine in a substantially S-shaped pattern. The S-shaped pattern serves as a spring.

Figure 5:
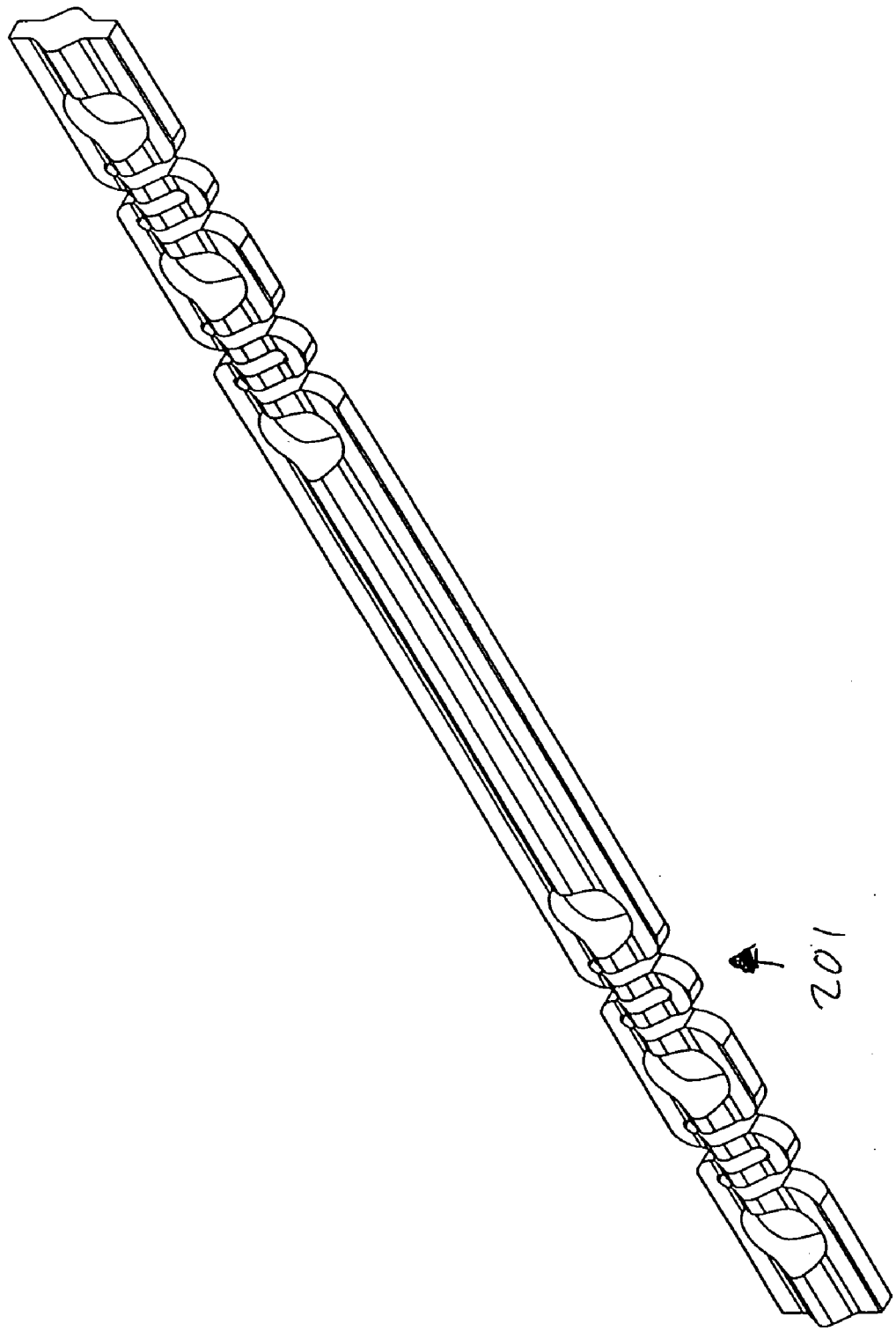
FIG. 5 illustrates another bearing spacer in accordance with the invention.

FIG. 5 illustrates a further bearing spacer in accordance with the invention. The bearing spacer of FIG. 5 is somewhat similar to the bearing spacer of FIG. 3. The bearing spacer of FIG. 5, however, includes more than two notches 201 at each flexible portion. As illustrated, the bearing spacer of FIG. 5 has three notches, two on one side of the bearing spacer with another on the other side of the bearing spacer.

Figure 6:
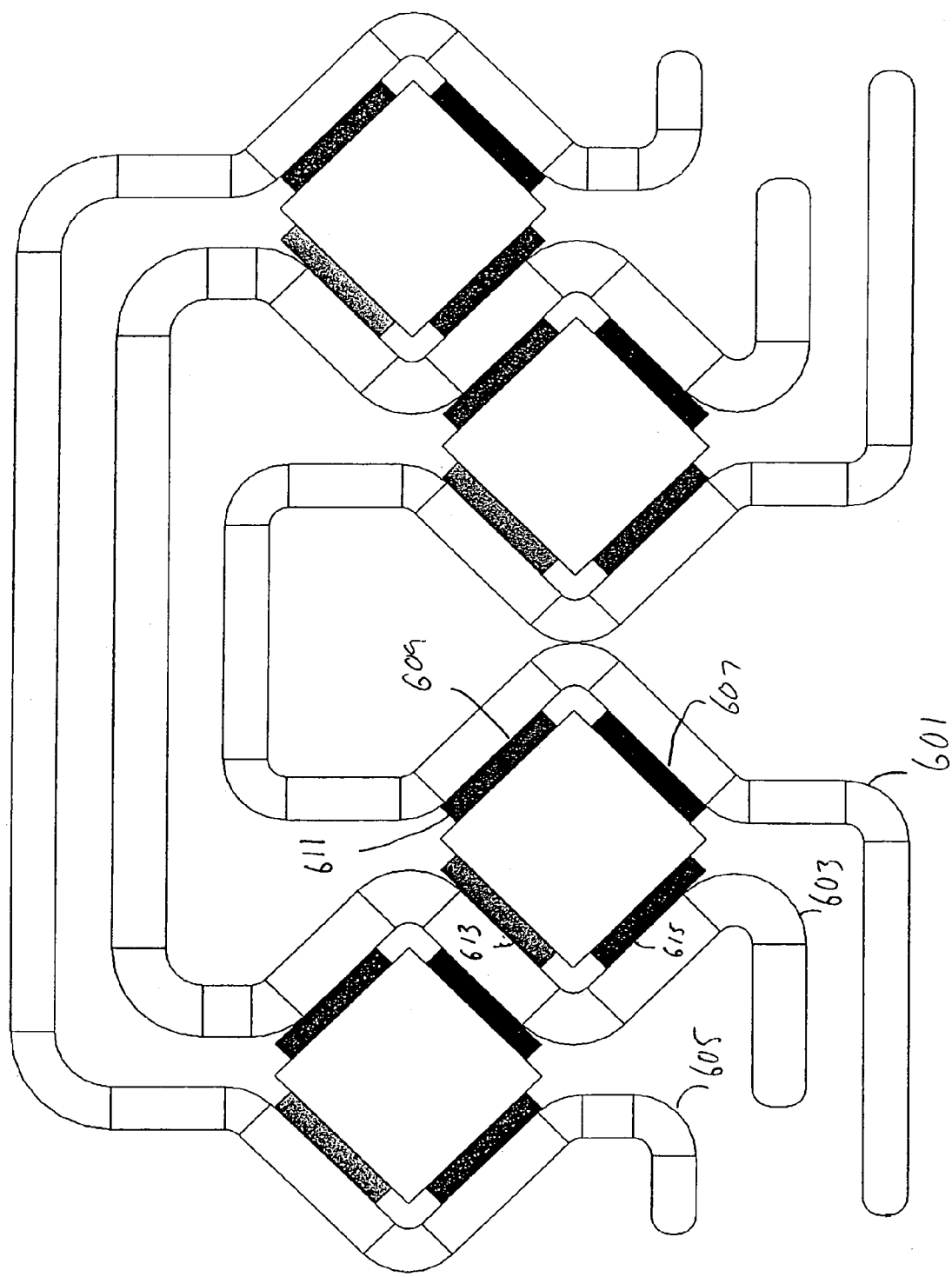
FIG. 6 illustrates an undermount drawer slide using bearing spacers in accordance with this invention.

FIG. 6 illustrates an undermount drawer slide in accordance with aspects of the invention. The undermount drawer slide includes a first member 601 nested within a second member 603, nested within a third member 605. The first, or inner, member has first 607 and second 609 surfaces, substantially perpendicular for contacting a bearing 611. Similarly, the second, or intermediate, member includes opposing first 613 and second surfaces 615 adapted to contact bearings as well. The surfaces on the second slide member are opposing in that a bearing contacting one surface of the first slide member will contact the opposing surface on the second slide member.

Figure 7:
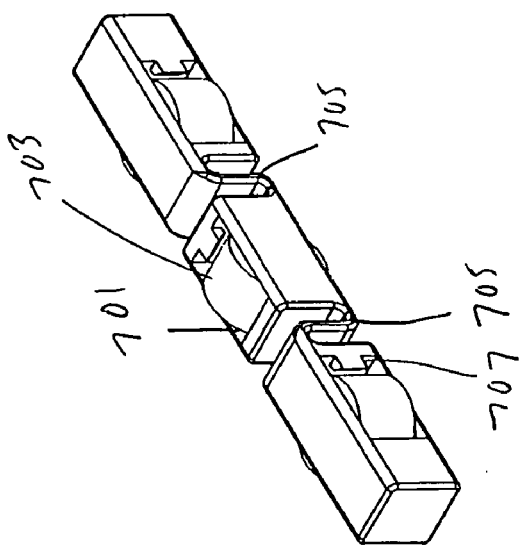
FIG. 7 illustrates a bearing spacer adapted for use in the slide of FIG. 6.

The undermount drawer slide includes bearing spacers for retaining bearings. One embodiment of a bearing retainer for use with the slide of FIG. 6 is illustrated in FIG. 7. The bearing spacer of FIG. 7 has a substantially rectangular cross-section. Apertures 701 extend through the bearing spacer, with the apertures adapted in the case of the spacer of FIG. 7 to receive roller bearings 703. Some of the apertures extend through one direction of the cross-section, with others extending through another direction of the cross-section. This allows some of the rollers to contact two parallel surfaces, with other rollers contacting parallel surfaces which are perpendicular to the first parallel surfaces.

The bearing spacer includes opposing notches 705 located between apertures. The opposing notches provide a flexible portion of the bearing spacer. Accordingly, contact against one end of the bearing spacer results in slight compression of the bearing spacer about its flexible portion.

As illustrated, the apertures include an undercut post 707 about the edge of the aperture. The undercut post serves to help maintain the bearing within the aperture, thereby retaining the bearing within the aperture.

Figure 8:
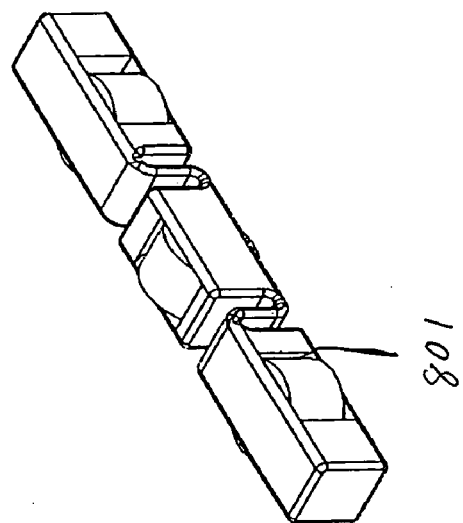
FIG. 8 illustrates a bearing spacer similar to that of FIG. 7 utilizing undercut retention.

FIG. 8 illustrates a further embodiment of a bearing spacer. The bearing spacer of FIG. 8 is similar to the bearing spacer of FIG. 7. However, the bearing spacer of FIG. 8 does not utilize an extending post to maintain the bearings in position. Instead, the bearing spacer of FIG. 8 includes a narrower edge about the aperture forming a full under cut 801.

Figure 9:
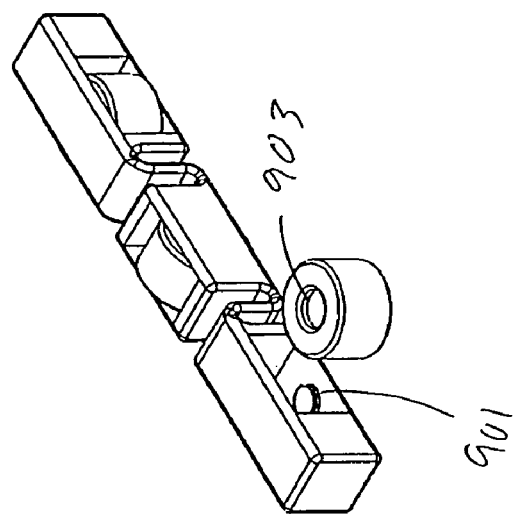
FIG. 9 illustrates a further bearing spacer in accordance with the invention.

FIG. 9 illustrates a further bearing spacer similar to that of FIG. 7. As with the bearing spacer of FIG. 8, the bearing spacer of FIG. 9 does not include a partial post extending within the aperture about its edge. Instead, the bearing spacer of FIG. 9 includes a small post 901 within the aperture. The post is located approximate the center of the aperture, and serves as an axle for a roller bearing. Preferably, and as illustrated with FIG. 9, the bearing includes an indentation 903 to receive the post acting as an axle.

Figure 10:
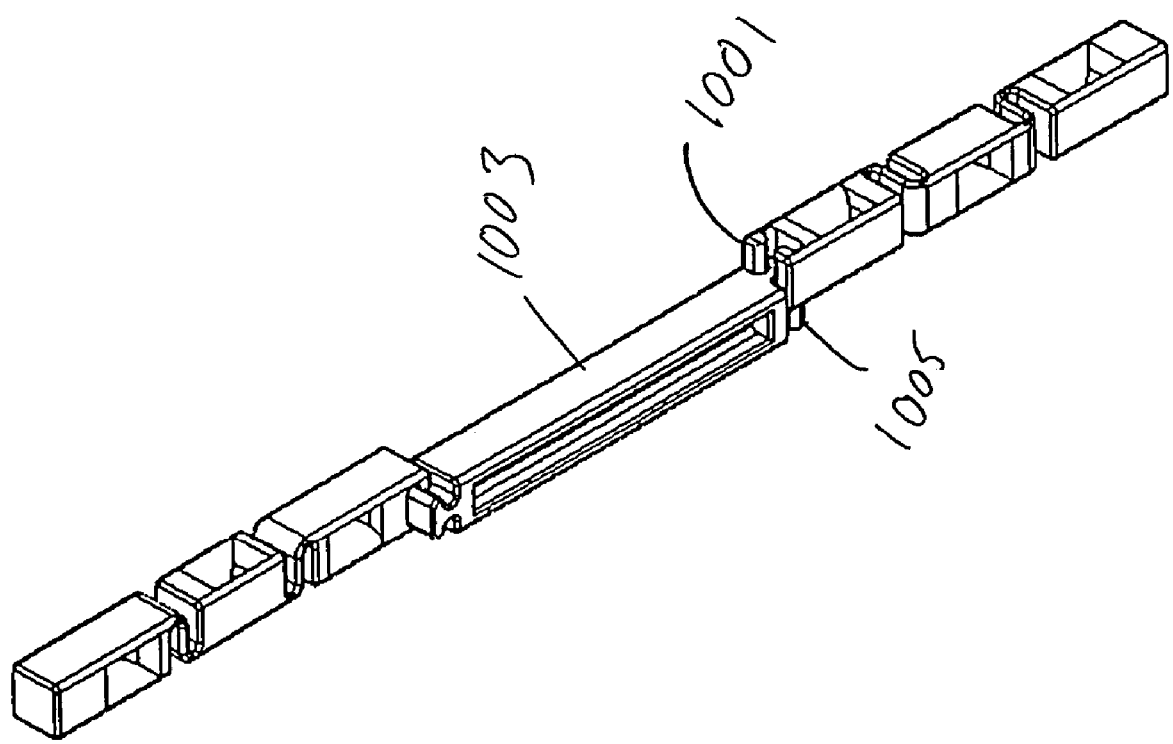
FIG. 10 illustrates a further bearing spacer in accordance with aspects of the invention.

FIG. 10 illustrates a further bearing spacer in accordance with aspects of the invention. The bearing spacer of FIG. 10 is somewhat similar to the bearing spacer of, for example, FIG. 8. The bearing spacer of FIG. 10, however, includes hooks 1001 about one end of the bearing spacer. The hooks are adapted to couple to posts of an extender 1003. The extender is substantially rectangular shaped with T-shaped posts 1005 about either end. The extender allows for increased versatility in the use of the bearing spacers.

Figure 11:
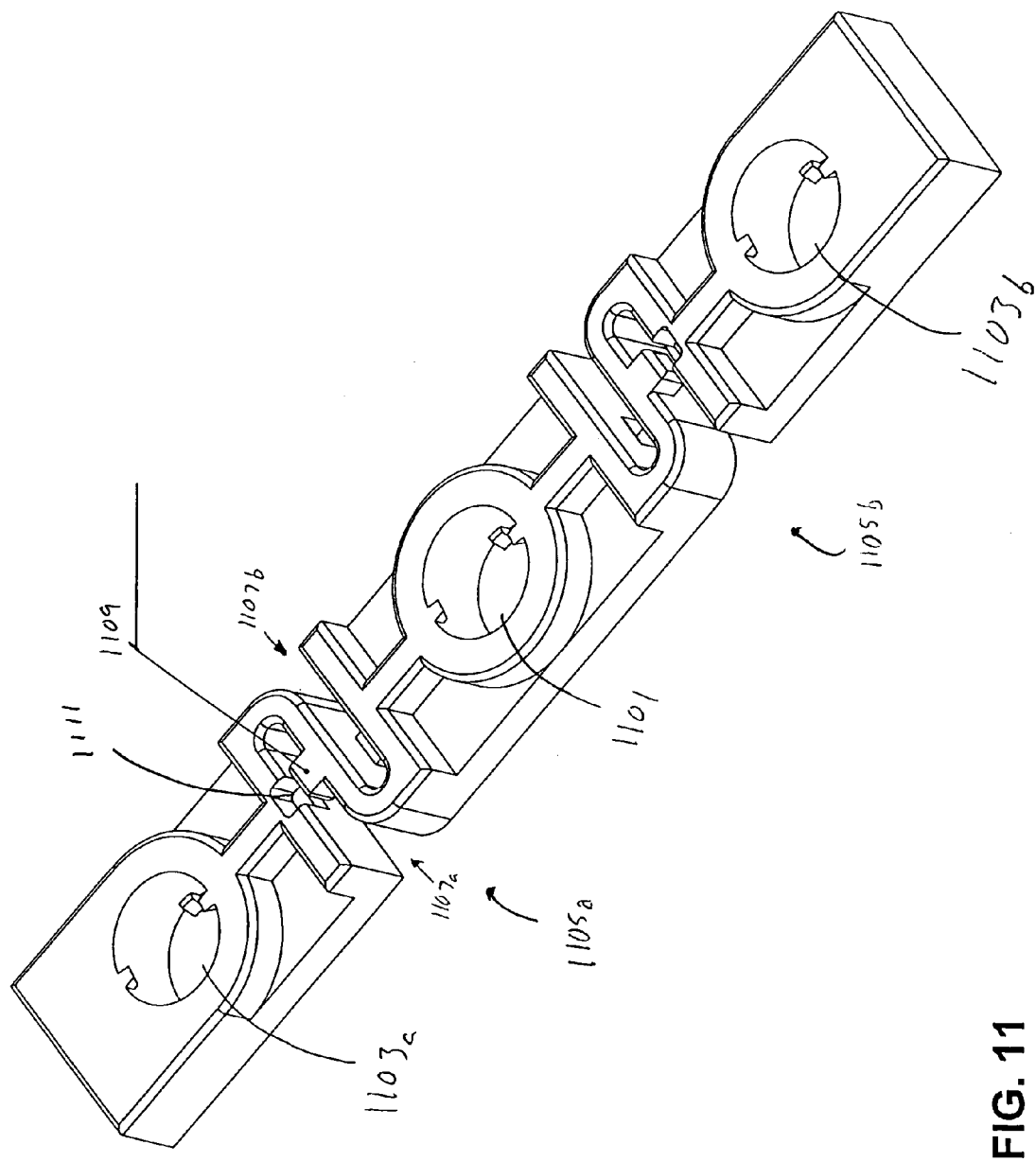
FIGS. 11–13 illustrate bearing spacers with an interlocking feature in accordance with aspects of the present invention.

FIG. 11 illustrates a further bearing spacer according to aspects of the invention. The bearing spacer includes apertures for three bearings, with a center aperture 1101 and two apertures 1103*a,b* approximate either end of the bearing spacer. Spring like structures 1105*a,b* are formed between the apertures. Each spring like structure is formed by providing two opposing notches 1107*a,b* approximate each other in the width of the bearing spacer. The two notches effectively form an S-like spring structure in the bearing spacer. An extending bar 1109 extends from one side of the notch into a volume formed by each notch. A corresponding cut-out 1111 is formed within the wall of the opposing side of each notch. The cut-out is adapted to receive the bar extending from the opposite side. As illustrated in FIG. 11, each notch is provided a bar and corresponding cut-out, with the notches and cut-outs arranged approximate opposing surfaces of the bearing spacer.

In operation application of force to the ends of the bearing spacer results in compression of the bearing spacer about the spring like structure. As the bearing spacer compresses, the bars enter the cut-outs. The bars are therefore constricted in side to side movement, such that the spring like structures compress linearly along the length of the bearing spacer. Accordingly, the structure helps prevent twisting or bending of the bearing spacer.

Figure 12:
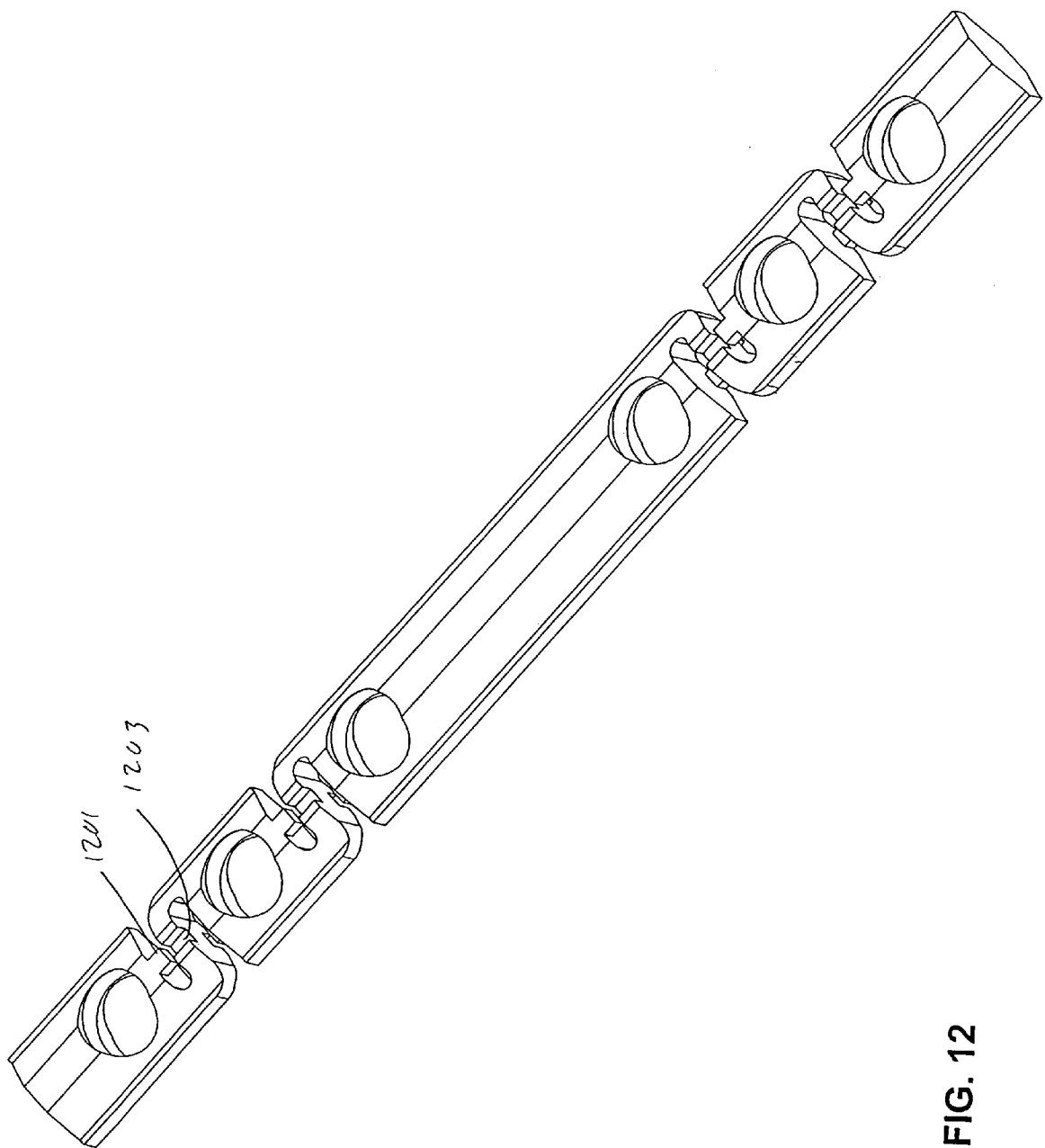

FIG. 12 illustrates a further embodiment in which opposing notches include a bar 1201 extending into the notch, and a portion of a wall separating the notches as cut out to form a slot 1203. The bar is adapted to travel into the slot, restricting non-linear movement of the bearing spacer.

Figure 13:
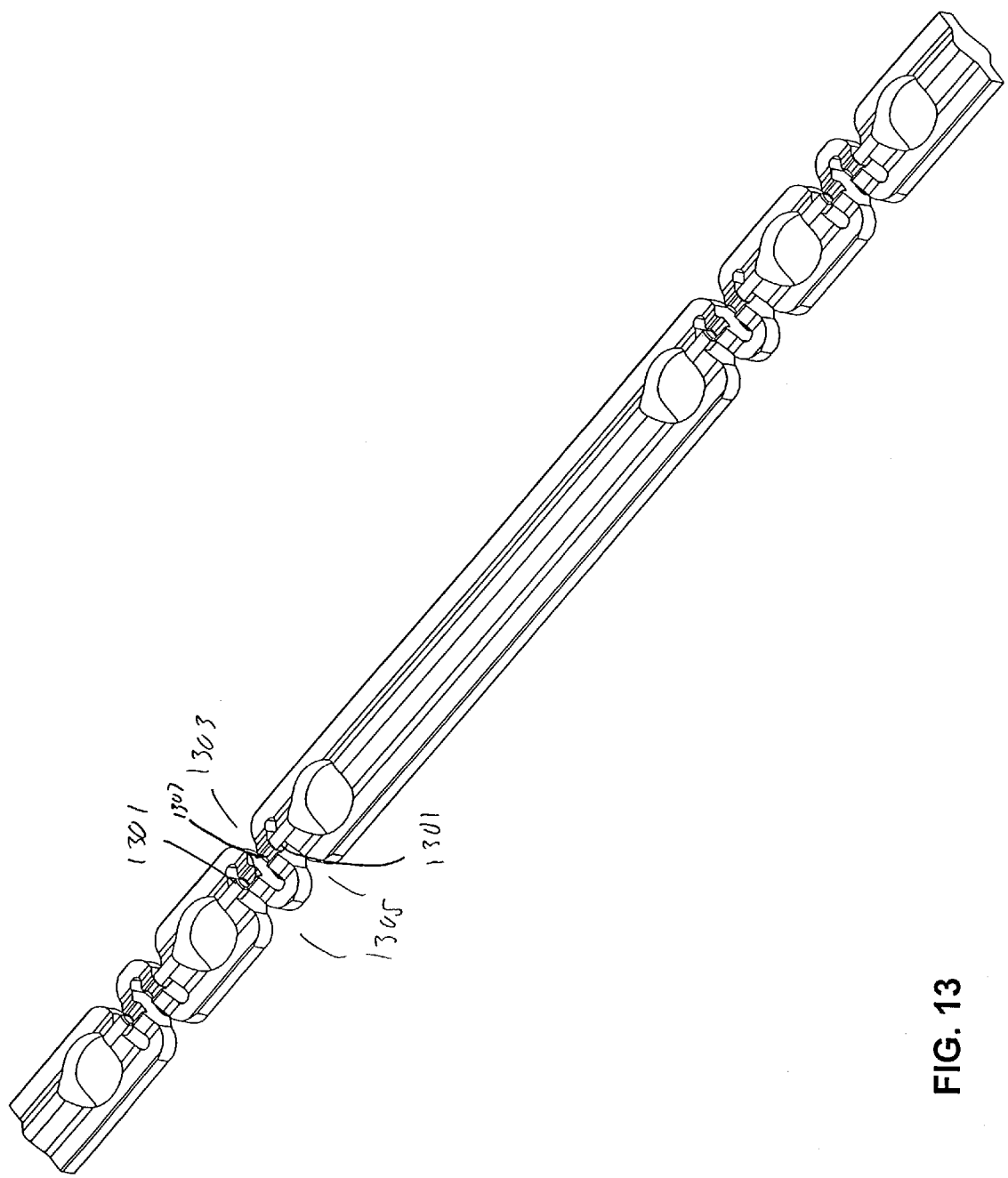

FIG. 13 illustrates a further embodiment of a bearing spacer in accordance with aspects of the invention. In the spacer of FIG. 13, a spring like structure is formed through the use of three notches, one 1303 from a first side of the bearing spacer and two 1305 from the opposing side of the bearing spacer, with a middle notch flanked by opposing notches. The bearing spacer of FIG. 13 also includes extending bars 1301, each on one side of the notch. The bars face each other from walls of the outer most notches, with the walls of the inner notch including a slot 1307 allowing for passage of the bar. In use, the bearing spacer of FIG. 13 reduces lateral movement of the bearing spacer as the bars extend into the slots during compression.

Figure 14:
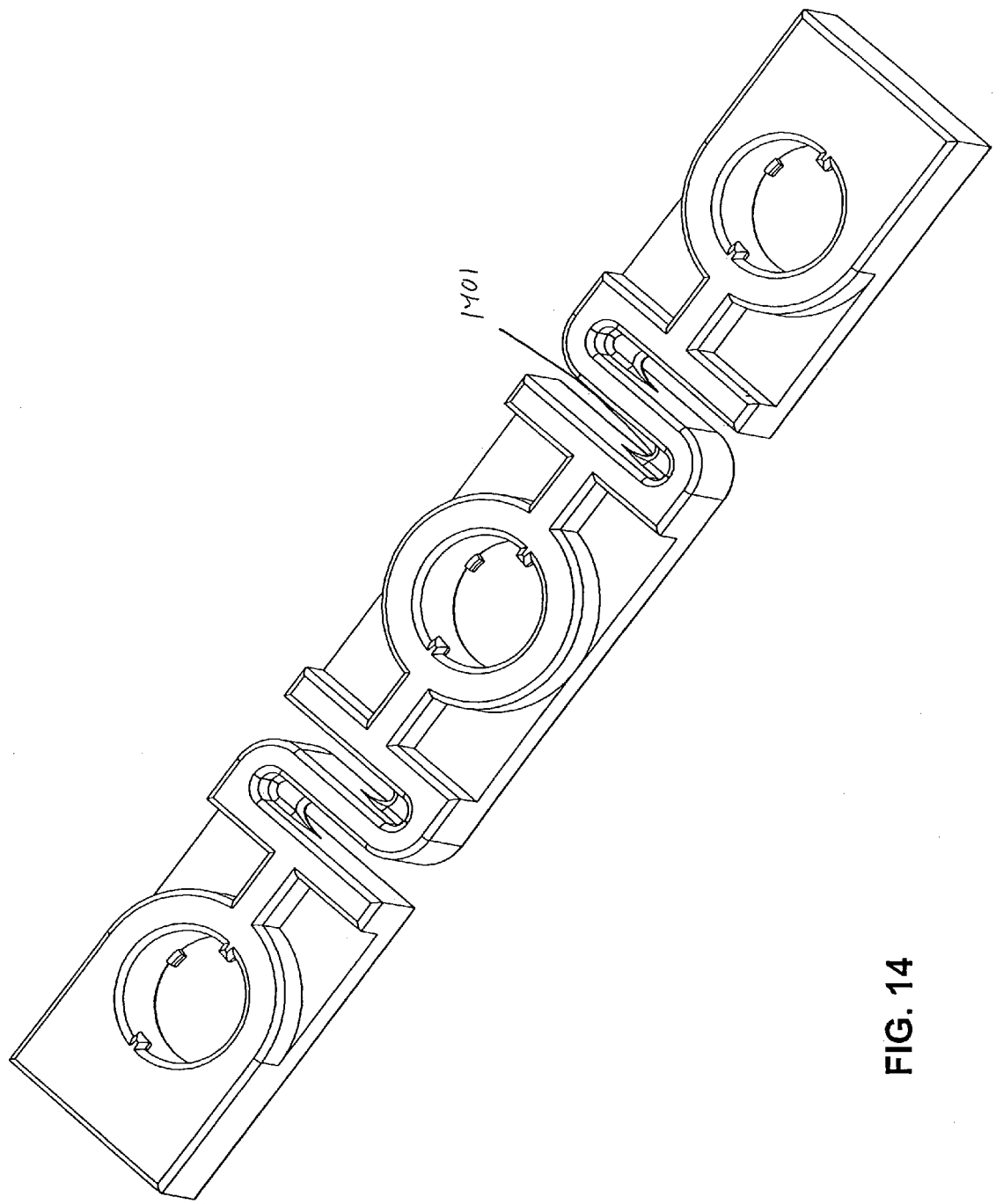
FIGS. 14–16 illustrate bearing spacers including stiffening supports in accordance with aspects of the invention.
Figure 15:
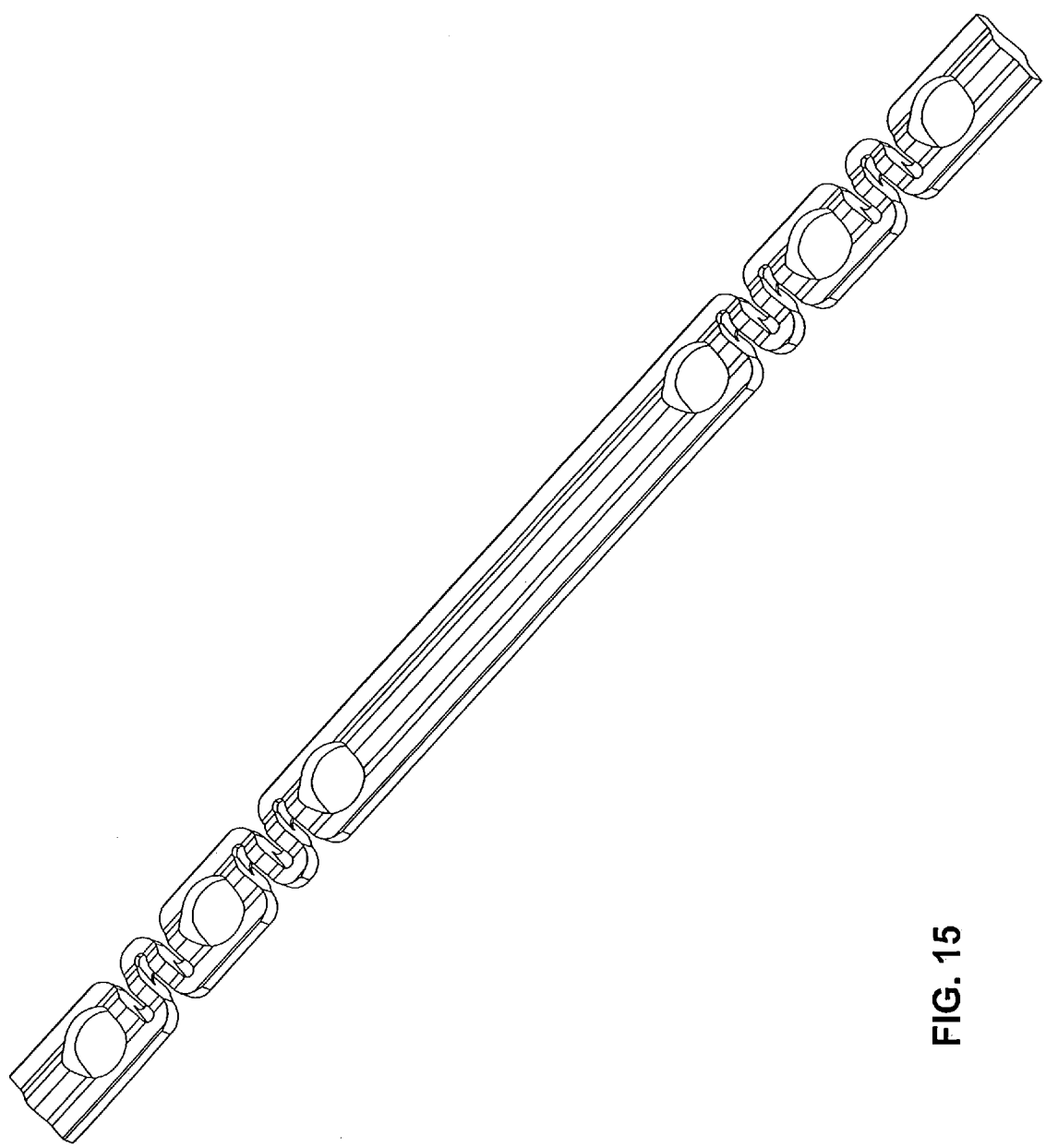
Figure 16:
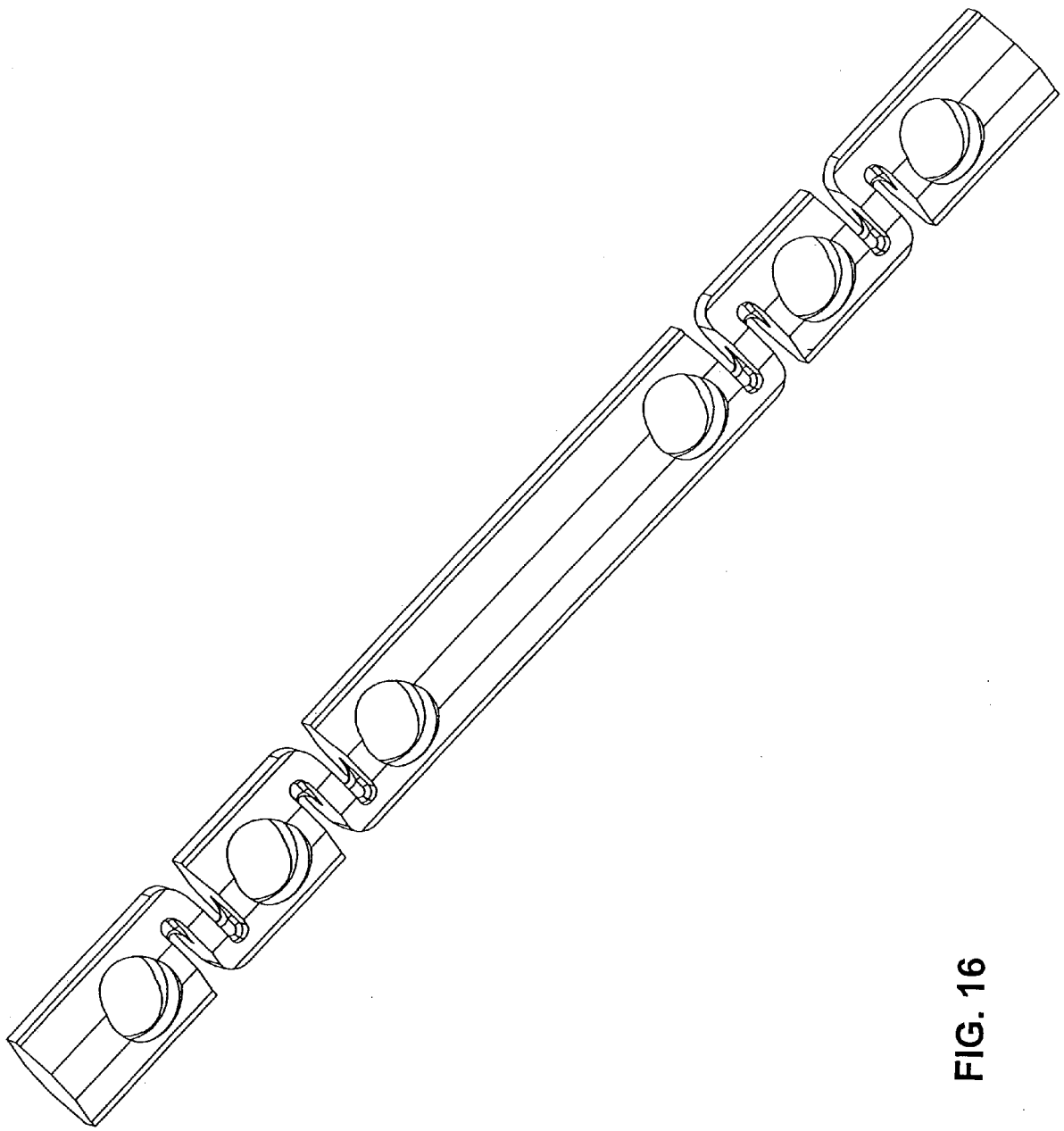

FIG. 14 illustrates a further bearing spacer in accordance with aspects of the invention. The bearing spacer of FIG. 14 also has a spring like structure formed by opposing notches forming an S-like spring. The notches of FIG. 14 include a spine 1401 approximate the end of the arch. The spine extends from one wall of the notch to the other. The spine serves to stiffen the spring-like response during compressing of the bearing spacer. FIGS. 15 and 16 illustrate further bearing spacers including notches having spines similar to that of FIG. 15.

Figure 17:
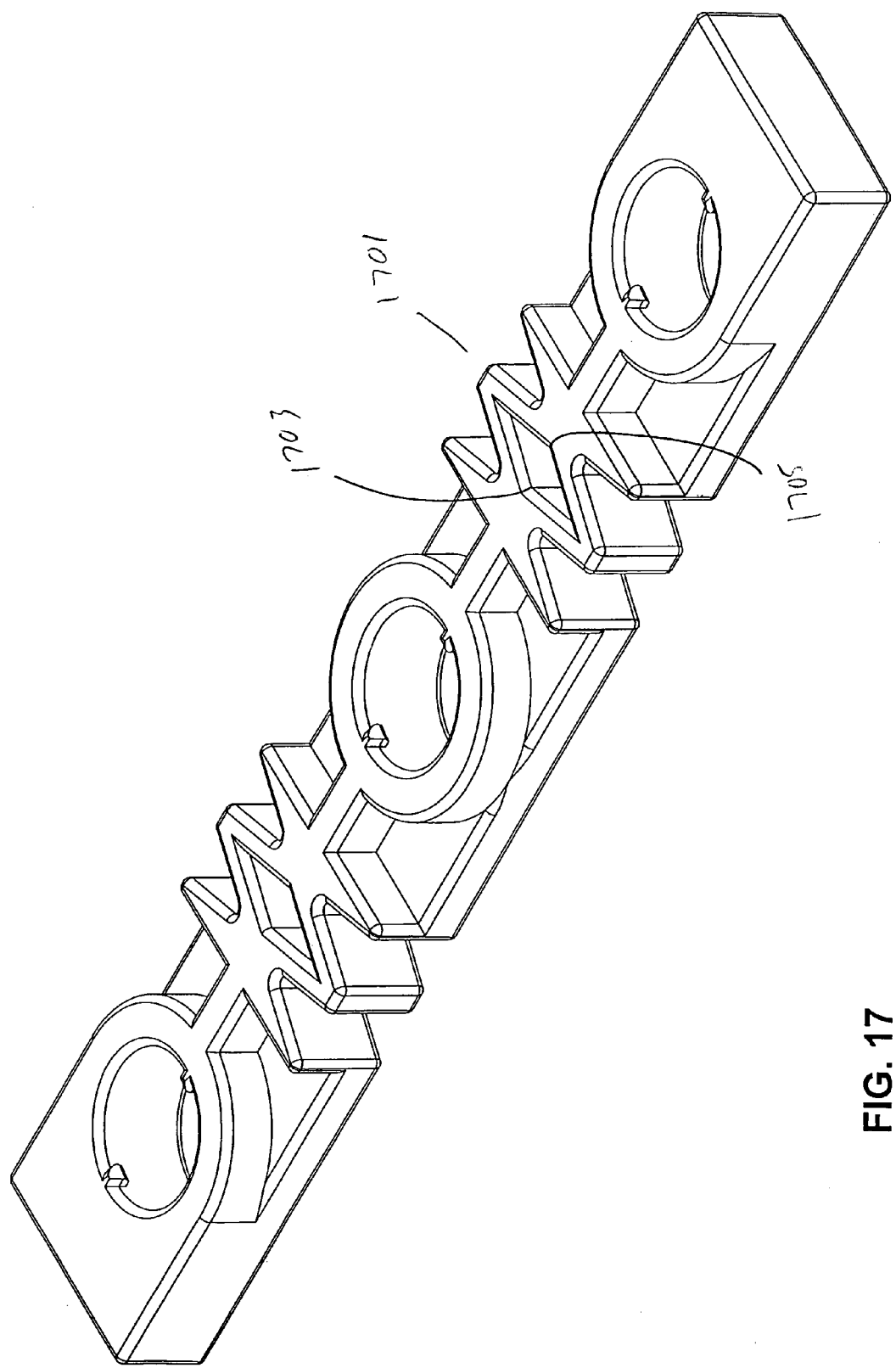
FIGS. 17–19 illustrate bearing spacers with molded spring structures in accordance with aspects of the invention.

FIG. 17 illustrates a bearing spacer having a diamond like spring structure 1701. The diamond like spring structure is formed of a section of the bearing spacer with a substantially quadrilateral cross-section. The quadrilateral cross-section allows two corners 1703, 1705 of the quadrilateral to approach a common intervening perpendicular plane. The movement of the edges of the quadrilateral provide for a flexing action during compression of the bearing spacer.

Figure 18:
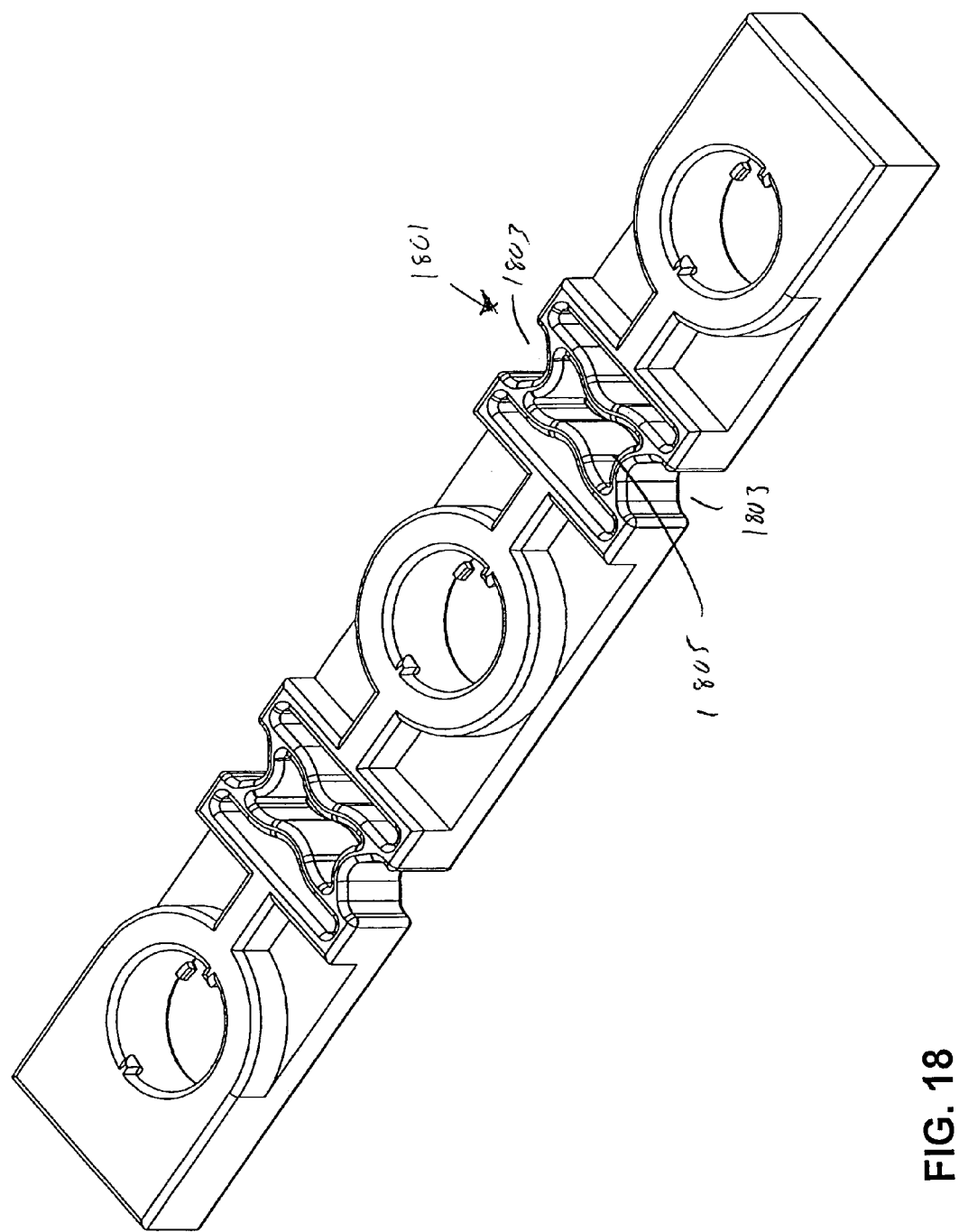

FIG. 18 illustrates a further bearing spacer with a spring-like structure. In the bearing spacer of FIG. 18 a compressible portion 1801 is placed between bearing apertures. The compressible portion is formed of two U-shaped indentations 1803 as well as a center deformable area 1805.

Figure 19:
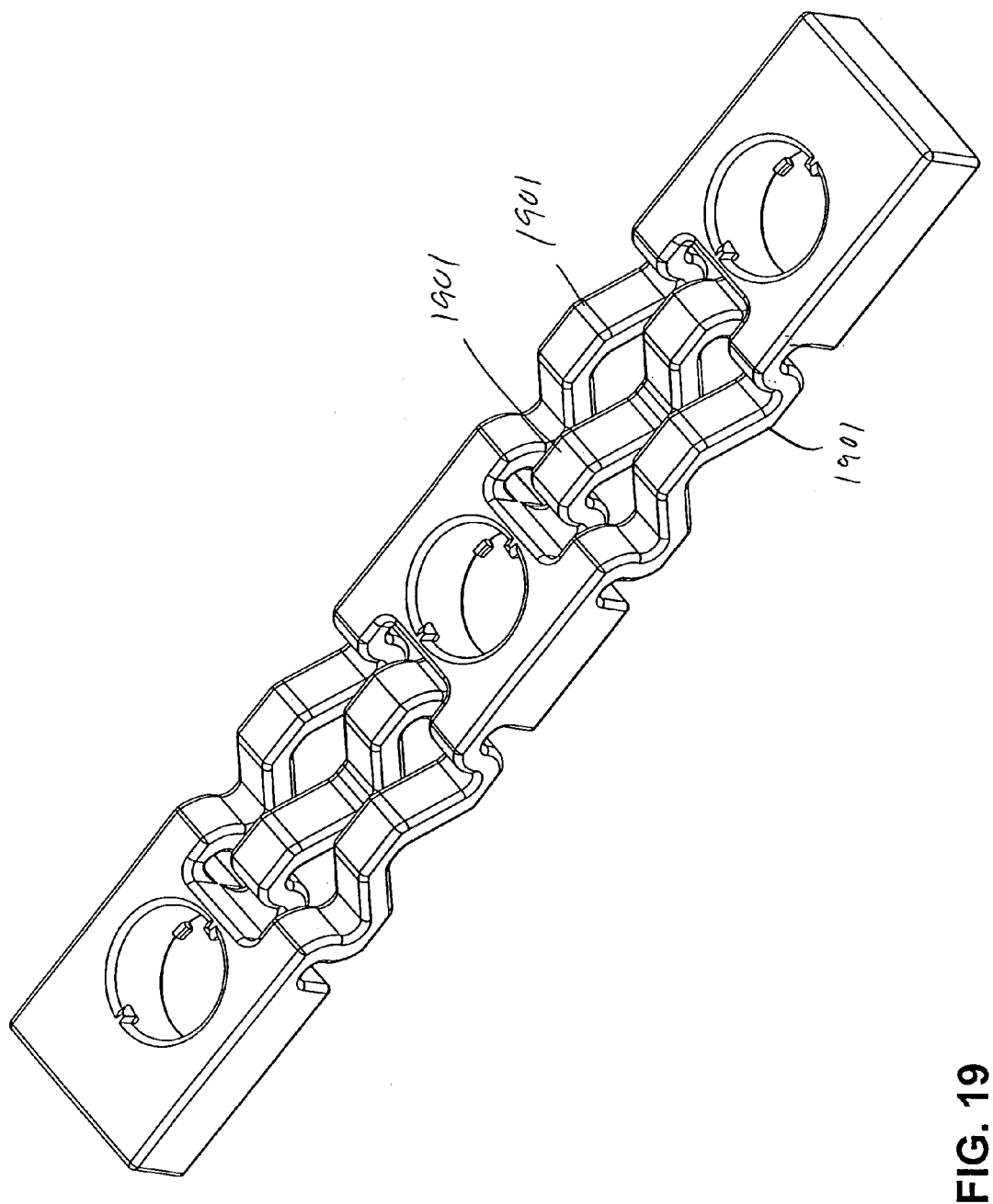

FIG. 19 illustrates a further bearing spacer in accordance with aspects of the invention. The bearing spacer of FIG. 19 includes three flexible links 1901 between each bearing aperture. The flexible links, in the embodiment of FIG. 19, are formed of undulating spring-like structures which are compressible.

Figure 20:
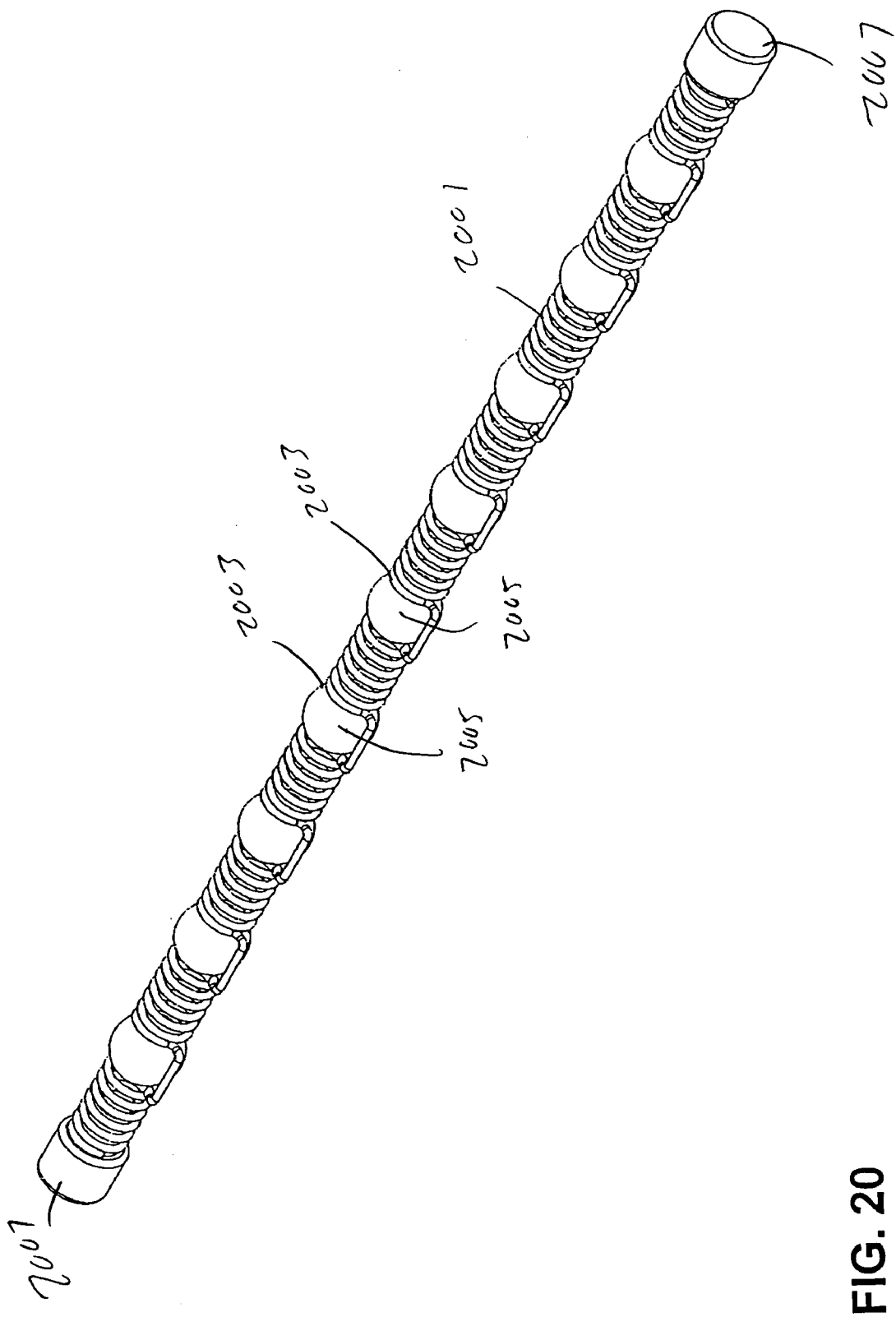
FIG. 20 illustrates a bearing spacer with bearings formed using a compressible structure.

FIG. 20 illustrates a further bearing spacer of the present invention. In the bearing spacer of FIG. 20 a spring 2001 is provided. The spring is formed of, for example, a coiled metal structure. Gaps 2003 are provided in the coils to allow for placement of ball bearings 2005. The ball bearings are maintained in place through the circular cross-section of the coils. In addition, the spring has end caps 2007 about either side. The end caps are adapted to contact surface and provide a compressive force to the spring.

Accordingly, the present invention provides a flexible bearing spacer. Although the invention has been described in certain specific embodiments, it should be realized that the scope of the invention is that of the claims and their equivalents supported by this disclosure.

What is claimed is:

1. A drawer slide assembly comprising:
    a first slide member and a second slide member each having an elongate planar web bounded by a first bearing raceway and a second bearing raceway along opposing margins of the web, the bearing raceways finning substantially the length of the planar web;
    a first plurality of bearings in rolling engagement with the first bearing raceways and a second plurality of bearings in rolling engagement with the second bearing raceways; and
    a first bearing spacer between the first raceways and a second bearing spacer between the second raceways, each bearing spacer comprising an elongate member having apertures linearly arranged along and orthogonal to a length of the elongate member, a centerline of each aperture aligned with the length of the elongate member, the apertures receiving the bearings, and a compressible portion symmetrical about a plane defined by centerlines of the apertures, the compressible portion separate from and between at least some of the apertures, the compressible portion allowing for compression of the bearing spacer along its length, wherein the compressible portion is compressible along a longitudinal centerline of the elongate member.

2. The drawer slide assembly of claim 1 wherein the compressible portion comprises a central deformable area approximate indentations in the side of the bearing spacer.

3. The drawer slide assembly of claim 2 wherein the indentations are substantially U-shaped.

4. The drawer slide assembly of claim 3 wherein the central deformable area is between the indentations.

5. The drawer slide assembly of claim 3, wherein the indentations are on either side of the central deformable area.

6. The drawer slide assembly of claim 2 wherein the central deformable area comprises a diamond like spring structure.

7. The drawer slide assembly of claim 2 wherein the central deformable area comprises a substantially quadrilateral cross-section.

8. The drawer slide assembly of claim 7 wherein the quadrilateral cross-section includes opposing corners along a line formed by the linearly arranged apertures of the elongate bearing spacer member.

9. The drawer slide assembly of claim 1, wherein the compressible section of the bearing spacer is molded.

10. The drawer slide assembly of claim 1 wherein the compressible portion comprises a plurality of flexible links.

11. The drawer slide assembly of claim 10 wherein the flexible links form undulating spring-like structures.

* * * * *